Aug. 29, 1961  W. E. BRANDT  2,997,813
APPARATUS FOR PRECISION FINISHING OF PARTS AND
OBJECTS BY CONTROLLED VIBRATION
Filed Feb. 20, 1957  8 Sheets-Sheet 2

INVENTOR
William E. Brandt,
BY John B. Brady
ATTORNEY

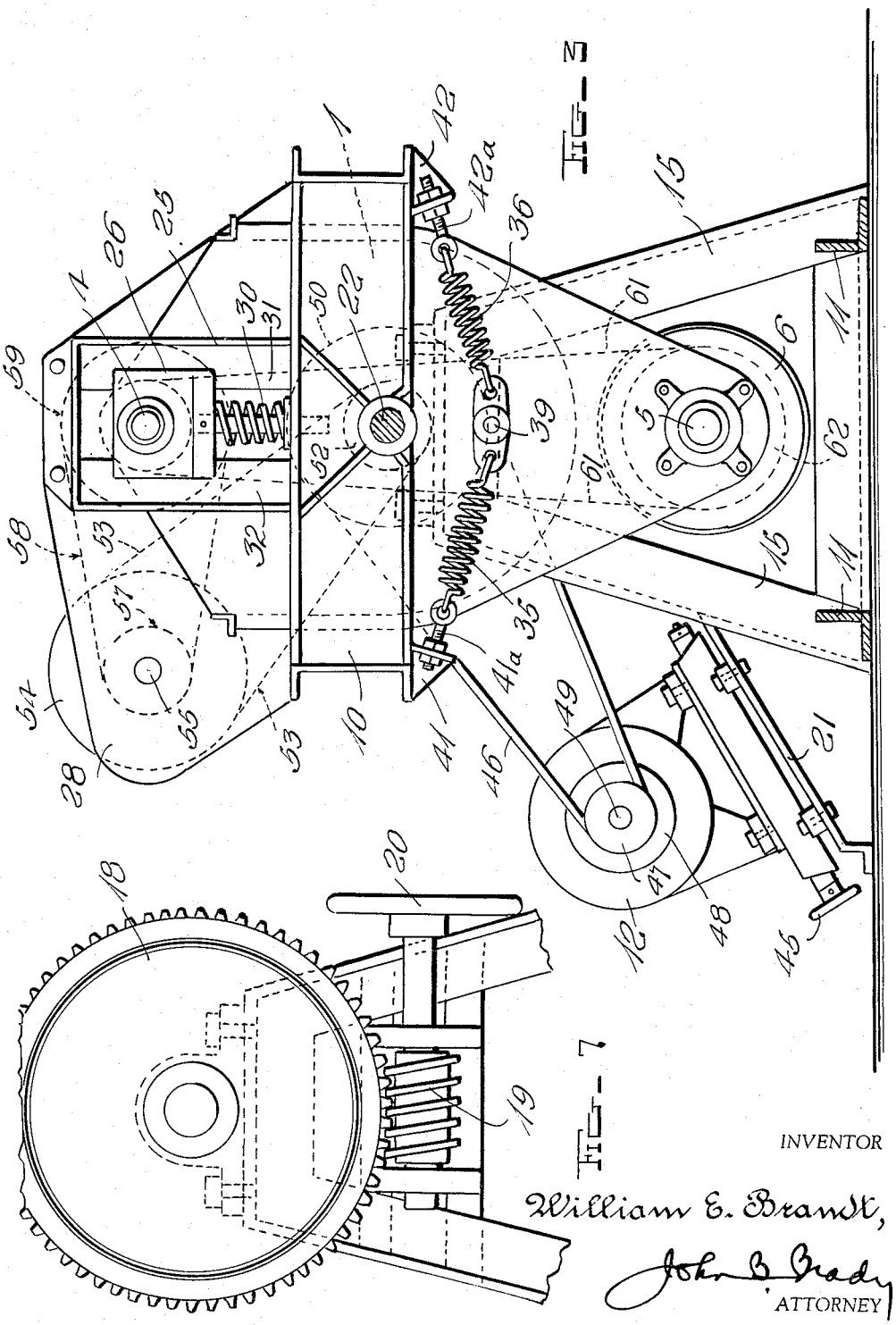

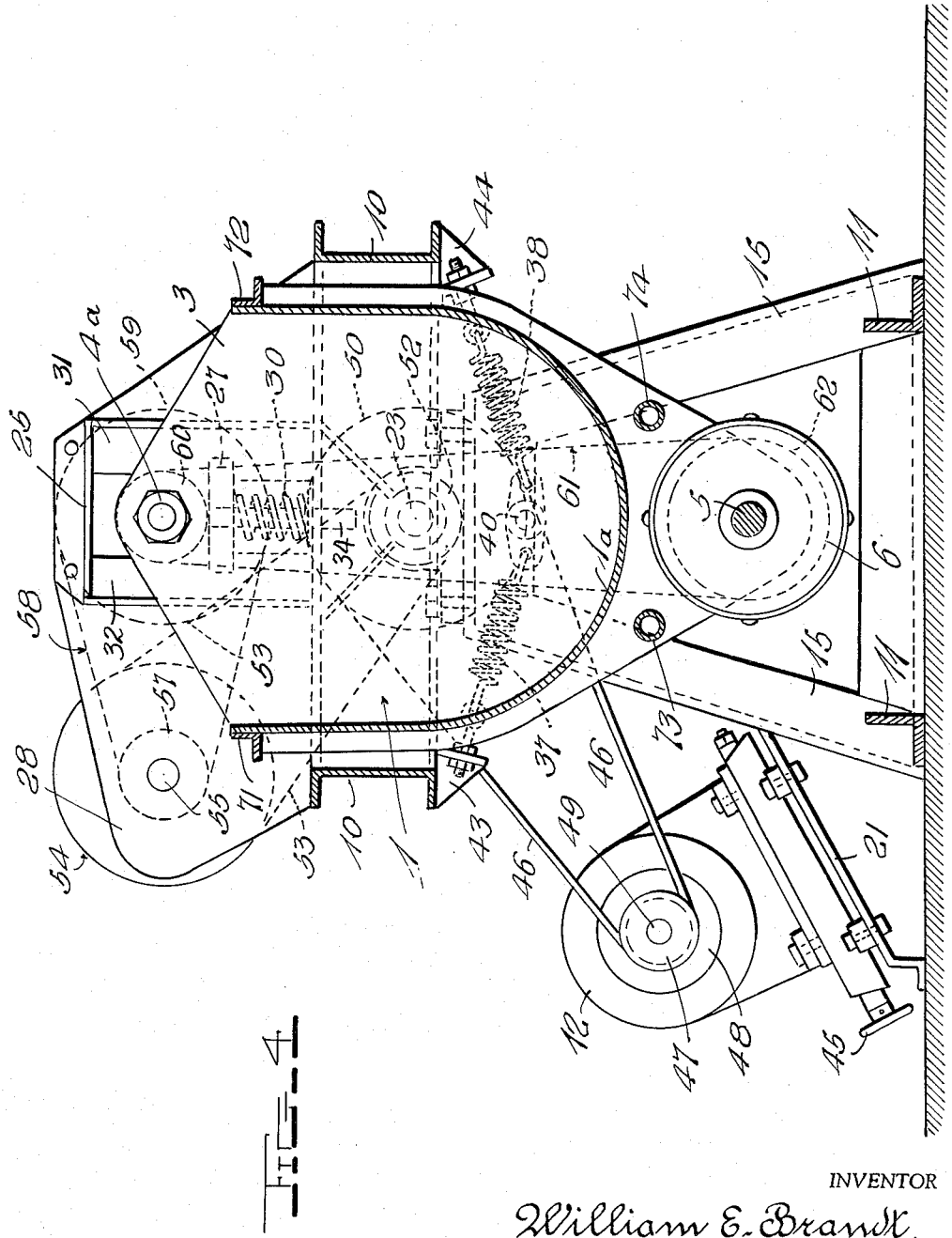

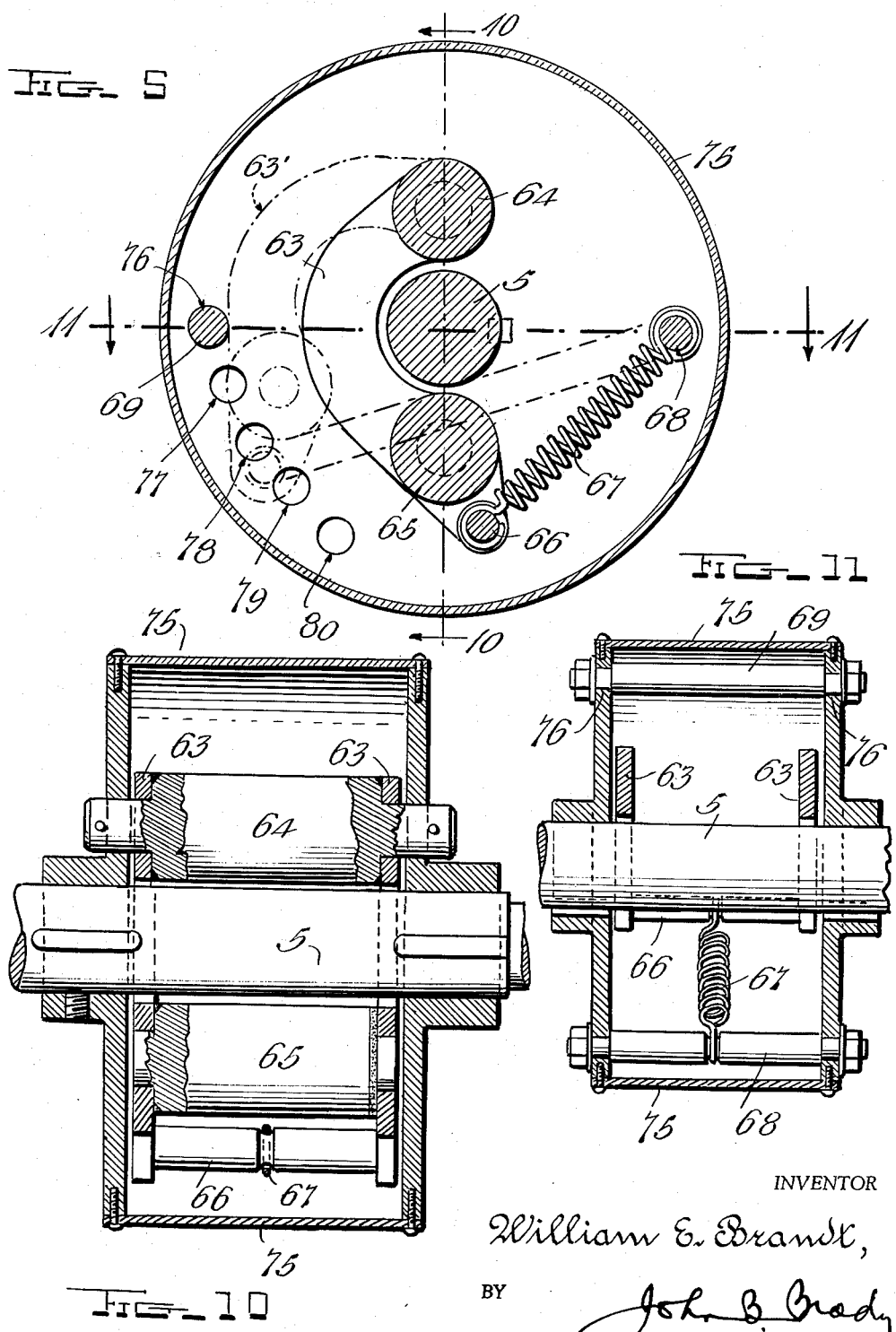

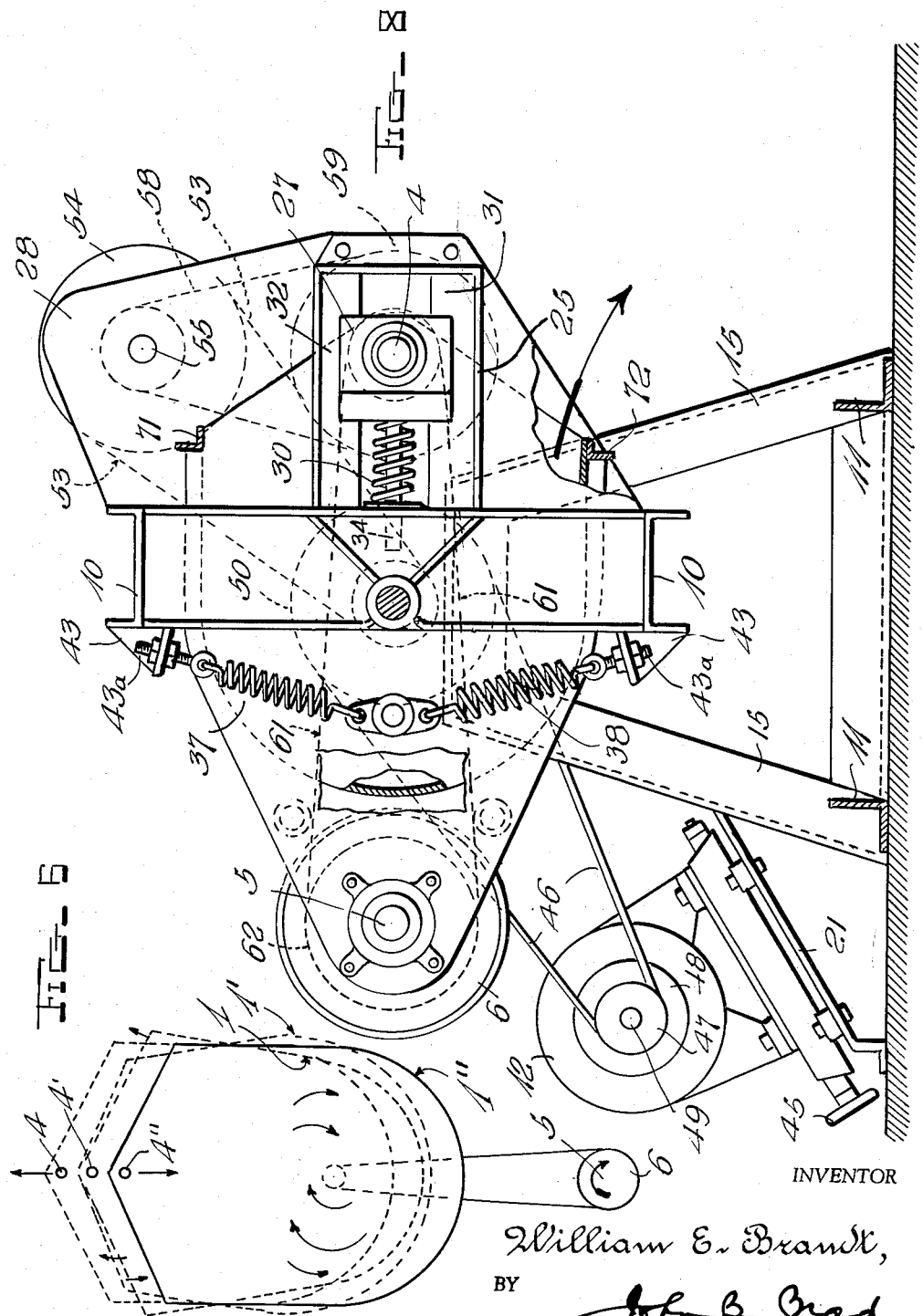

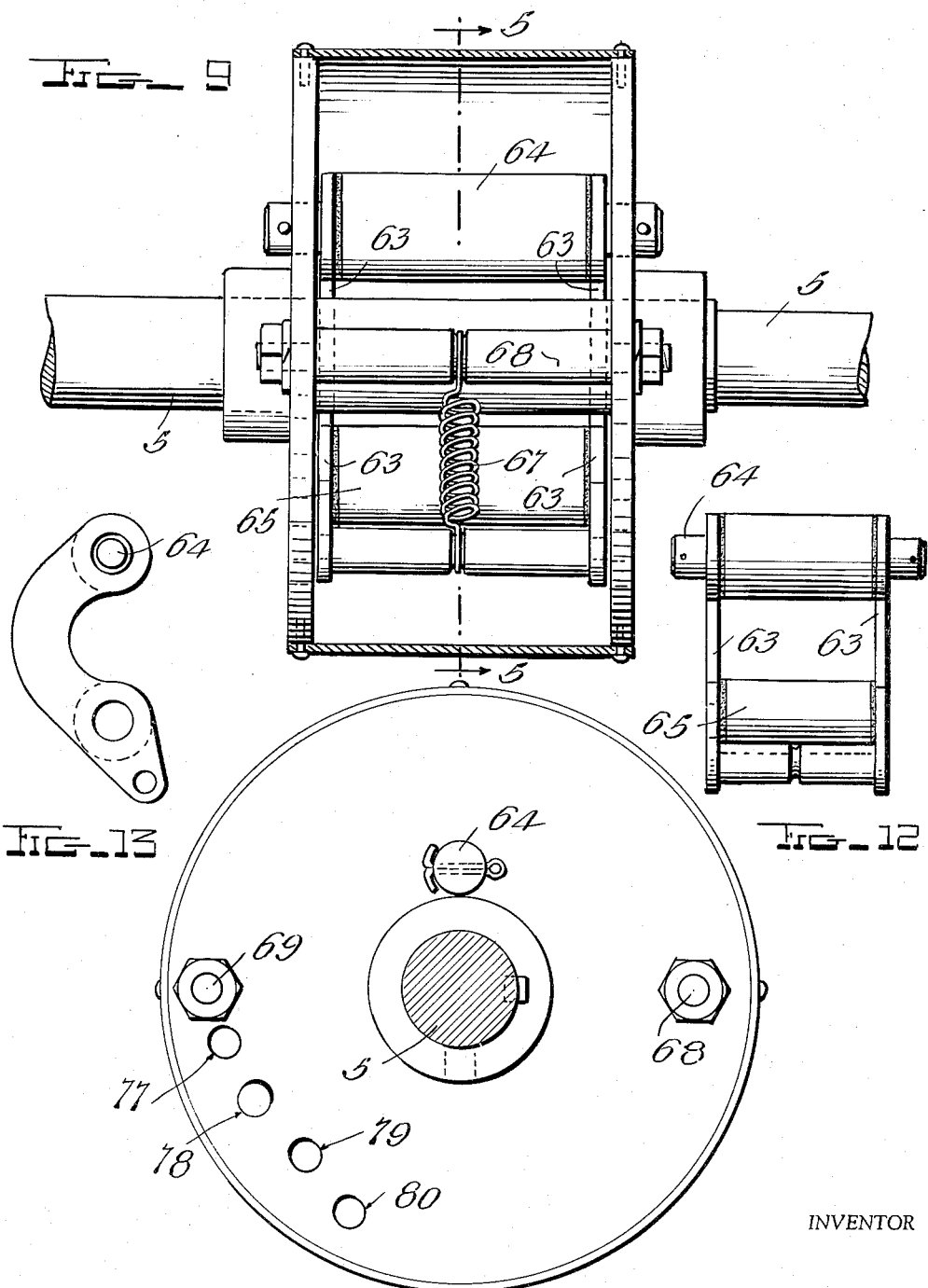

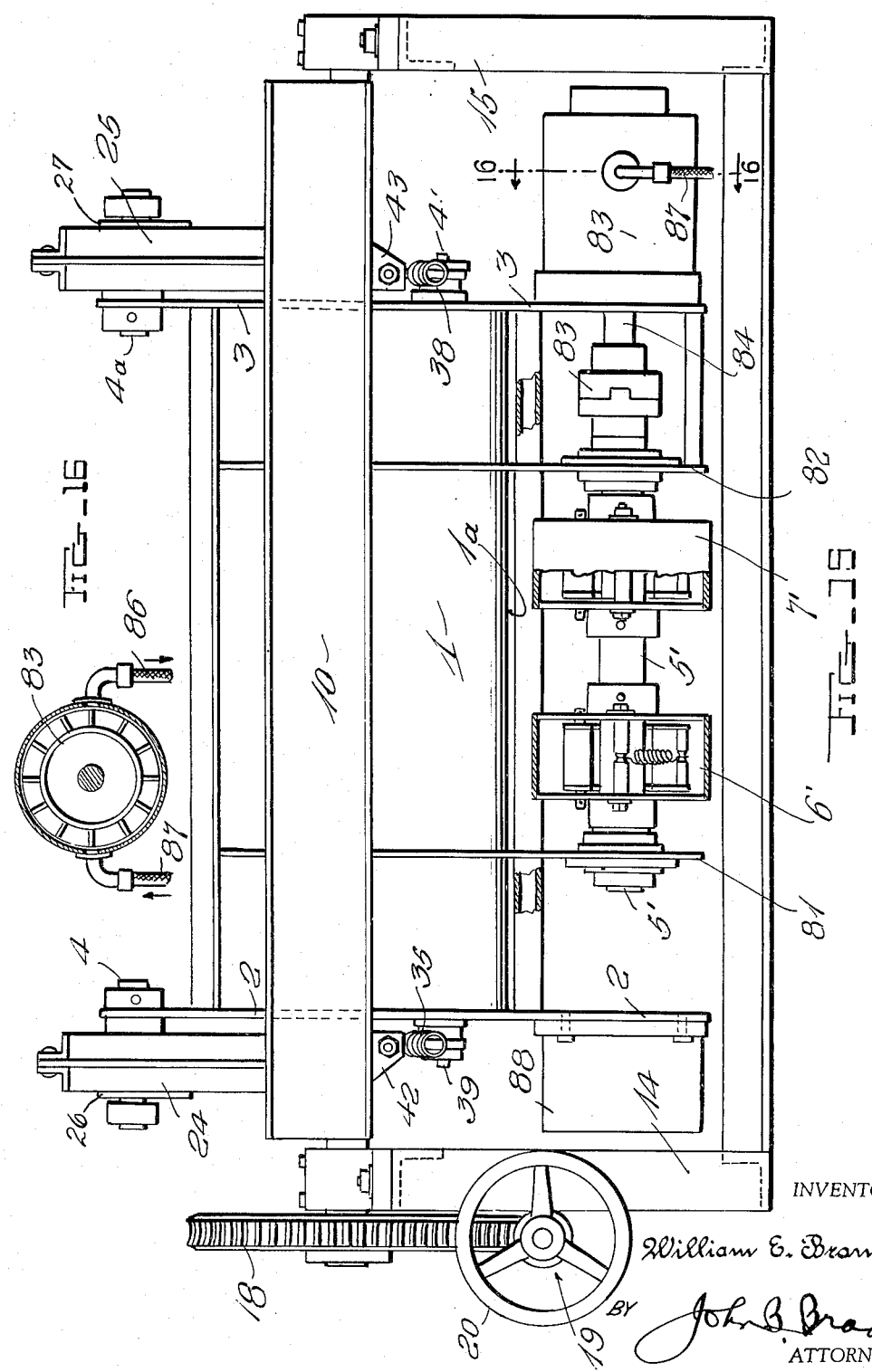

United States Patent Office 2,997,813
Patented Aug. 29, 1961

2,997,813
APPARATUS FOR PRECISION FINISHING OF PARTS AND OBJECTS BY CONTROLLED VIBRATION
William E. Brandt, Red Lion, Pa., assignor, by mesne assignments, to Bell Intercontinental Corporation, a corporation of Delaware
Filed Feb. 20, 1957, Ser. No. 641,399
17 Claims. (Cl. 51—7)

My invention relates broadly to a process and construction of machine for the precision finishing of parts and objects by descaling, deburring, grinding, radii formation, fine finishing, coloring, burnishing, and otherwise treating such parts and objects and more particularly to a process and machine for subjecting parts and objects to controlled vibration.

One of the objects of my invention is to provide a method and process for subjecting parts and objects to controlled vibration for thus descaling, deburring, grinding, radii formation, fine finishing, coloring, and burnishing such parts and objects.

Another object of my invention is to provide a construction of a machine which will process by rotary or other vibratory motion, parts or objects placed into the machine with the necessary abrasive or non-abrasive media and/or other abrasive or non-abrasive chemicals or chemical compounds in order to obtain the specifically required results, accurate as to the degree of finish desired, in minimum time as compared with present day methods and also yielding results to a degree which cannot now be obtained in tumbling barrels on shielded surfaces of the work parts.

Another object of my invention is to provide a method for treating objects to produce a desired surface change, finish or polish of objects placed into the machine with the necessary abrasive or non-abrasive media and/or abrasive or non-abrasive chemicals or chemical compounds by means of controlling variables such as amplitude to the rotary or other vibrations and period of vibration frequency, independent of each other, in order to obtain the various effects desired and best suited for each particular material and finish desired.

Another object of my invention is to provide a process and apparatus for treating parts and objects either by association with a vibrating, surrounding media or compound or by vibrating such media or compound around the work pieces where the work pieces may be stationary.

Still another object of my invention is to provide a mounting for a container for receiving parts and objects in combination with a treating media where the container is subjected to a composite linear and elliptical motion for imparting to the contents of the container forces which effect descaling, deburring, grinding, radii formation, stock removal, fine finishing, coloring and burnishing of the parts and objects.

Still another object of my invention is to provide an assembly of compression and tension springs in a structure for imparting vibratory movement to the contents of a container whereby controlled linear and elliptical motion may be imparted to the contents of the container.

Other and further objects of my invention reside in the structure of vibrating machine as set forth more fully in the specification hereinafter following by reference to the accompanying drawings, in which:

FIG. 3 is an end view of the vibrating machine;

FIG. 4 is a transverse sectional view taken substantially on line 4—4 of FIG. 1;

FIG. 5 is a vertical sectional view through one of the flyweight eccentrics taken substantially on line 5—5 of FIGS. 1 and 9 for controlling the elliptical movement imparted to the container of the vibrating machine;

FIG. 6 is a theoretical view showing the composite linear and elliptical motion which is imparted to the container of the vibrating machine of my invention for correspondingly inducing composite forces into the contents of the container for effecting the descaling, deburring, grinding, radii formation, stock removal, fine finishing, coloring, and burnishing of parts or objects in the container;

FIG. 7 is a fragmentary end view looking at the machine from the opposite end to that of FIG. 3 and showing the adjustment means for dumping the contents of the container;

FIG. 8 is a view similar to the view illustrated in FIG. 3, but showing the container moved by means of the control mechanism for dumping the contents of the container;

FIG. 9 is a front view of one of the eccentric flyweights with the casing broken away and illustrated in section;

FIG. 10 is a vertical sectional view taken through the eccentric flyweight unit substantially on line 10—10 of FIG. 5;

FIG. 11 is a horizontal, sectional view through the eccentric flyweight on line 11—11 of FIG. 5;

FIG. 12 is a front view of the flyweight removed from the eccentric support shown in FIGS. 5 and 9–11;

FIG. 13 is a side view of the eccentric flyweight member used in the assembly of FIG. 12;

FIG. 14 is a side view of the casing of the eccentric flyweight and showing particularly the adjustability of the stop in the flyweight casing by which the amplitude of the displacement of the flyweight may be controlled;

Figure 1:
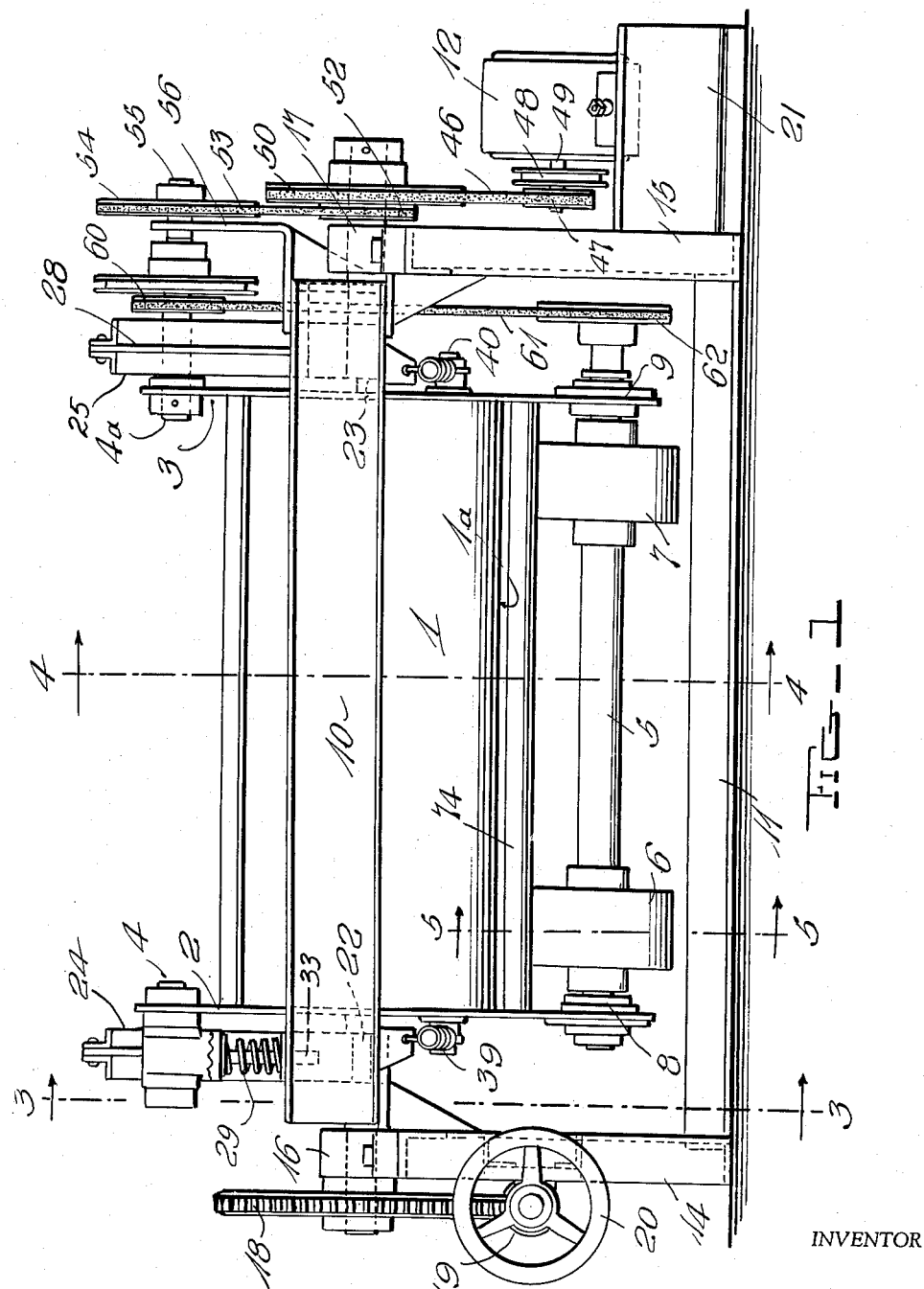
FIG. 1 is a side elevational view showing the vibrating machine of my invention.

FIG. 15 is a side view of a modified form of vibration machine embodying my invention, where the container is driven by either pneumatic or hydraulic means attached to the mass of the container and connected through flexible conduits to the fluid source and showing particularly the manner of symmetrically compensating for the effect of the mass of the pneumatic or hydraulic drive attached to the container;

FIG. 16 is a vertical, sectional view on line 16—16 of FIG. 15, showing the manner in which the flexible conduits connect to the pneumatic or hydraulic drive attached to the container.

The techniques, processes and machinery of my invention are well adapted to automation and continuous processes. This is a great advantage in overcoming the batch type work as is necessary in conventional tumbling or barrel finishing. The methods, techniques and machinery described may be automatically charged and recharged with media, compound and work pieces. The method and apparatus of my invention employs the principle of controlled vibration in two ways, namely:

(1) The work pieces may be vibrated with surrounding media, compounds, etc.

(2) The work pieces and/or containers, or fixtures containing work pieces, may be stationary with the media and compound vibrating with the container or fixture. Faster and more severe action is obtained with this latter method.

In addition to processing work pieces free or stationary by the vibratory method, I may also provide a rubberized compartmental wire basket with such parts as should not touch each other and submerge such entire basket or fixture into the vibrating mass. I may also provide a rubberized conveyor belt and/or fixtures which move through the vibrating mass at a predetermined rate automatically.

Whereas in conventional tumbling methods only such surfaces are satisfactorily processed as are exposed to the load pressure in the barrel, and shielded surfaces (such as recesses or blind holes or tubular openings receive little or no action whatsoever), such shielded surfaces are very satisfactorily processed by the controlled vibratory method of my invention.

The machine of my invention allows variation, at will, of frequencies and amplitudes of vibration over certain ranges, to suit a particular purpose, and results in rapid descaling, deburring, grinding, radii formation, stock removal, fine finishing, coloring, and burnishing of any metal, metal alloy or plastic parts, if used with the proper media, proper compounds and the proper techniques.

I construct the machine to impart a composite linear and elliptical motion to the contents of the container or bowl. I construct the container or bowl of welded sheet steel mounted on a vibrating base through springs and associated inertia means to impart an elliptical motion to the mass in the container. The curvatures of the sides of the container and a tilting mechanism control the movement of the entire mass in the container. Every particle and work piece of the mass in the container is subjected to this composite linear and elliptical movement.

In a conventional tumbling barrel or precision barrel finishing machine the real work of descaling, deburring, stock removal, grinding, radii formation, fine finishing, coloring, or burnishing is accomplished in the slide while very little or no work is accomplished during the lift to the top of the slide. The length of the slide is determined by the diameter of the barrel and the surface feet traveled by the work piece in the surrounding medium or media and compound, by the speed of rotation as well as by the length of the slide. In the present invention, the entire mass in the container is continually in work motion and, in addition, the scrubbing motion imparted by the vibratory action further hastens the working process.

I have conducted extended research affecting the type of motion of the entire mass in the container, as well as the amplitude and frequency of the vibration, which establishes that desired results on the work pieces are obtained in a small fraction of time usually required in conventional tumbling barrels or precision barrel finishing machines. My invention also makes possible the obtaining of effective action on work surfaces so shielded that little or no action can be obtained on the same surfaces in conventional tumbling or barrel finishing equipment.

Continued research proved that the shape of the container may be varied to suit the object to be processed so that the invention is not confined to processing serial parts of whatever size and shape in a mass production program, but to processing raw ingots, billets, strips, coils, etc. of the basic metal industries as well.

The media usable with my invention extend over a very large range and include manufactured as well as natural abrasive and non-abrasive materials. Particular sizes as well as mixtures of sizes and size ranges of media may be used, depending on the work to be accomplished. Synthetically prepared fused or bonded aluminum oxide chips and other materials, naturally mined chips or shapes, a large variety of soft or hard steel, wood, ceramic and plastic media find application in this invention.

Of importance also are a large variety of abrasive and non-abrasive compounds which may be used with this invention in wet or dry process for descaling, deburring, radii formation, grinding, stock removal, fine finishing, coloring or burnishing.

A deburring operation, for instance, which would normally require a 4½-hour time cycle by the best methods in conventional tumbling, was accomplished in 15 minutes by use of the present invention. A fine-finishing operation on jewelry items such as wedding bands and complicated diamond settings which requires 2½-day time cycles in a precision barrel finishing machine was accomplished in 1½-hours. Jet parts of extremely hard metals which conventional barrel finishing could not process satisfactorily in 6-hour, 12-hour, 24-hour and 48-hour time cycles were finished to complete satisfaction in 45 minutes, 1½-hours, 3-hours and 5-hours, respectively.

My invention is also applicable in the preparation and descaling for detection of hair line cracks and other surface imperfections, of high grade tool steel billets and similar materials for further processing.

My invention is directed to the precision finishing, i.e., descaling, deburring, radii formation, grinding, stock removal, fine finishing, coloring and/or burnishing of metal, metal alloys or plastic objects by means of controlled vibration imparted in rotary or other motion to the working parts or objects, media and/or compounds in wet or dry process, with or without benefit of liquids.

Referring to the drawings in more detail, the main components of the machine are: a bowl or tub of desired shape such as, for example, a rectangular container with a curved or rounded bottom, straight vertical sides and flat vertical ends, welded or otherwise constructed so as to form an integral body. I have used the words bowl and container synonymously. The bowl ends 2 and 3 extend up vertically above the level of the vertical positions of the bowl sides and downwardly below the curved or rounded bottom 1a of the bowl. The sides of the upper portion of the bowl may also be curved inward or be shaped variously to guide the flow of the contents in a specific manner. Stub shaft pivotal supports 4 and 4a are provided on an axis parallel to the longitudinal axis of the container and near the top of the end plates 2 and 3, passing through fitted holes at the ends of the container in the end plates 2 and 3 for pendently suspending the container well above its center of gravity. While I have shown the stub shaft suspension it will be understood that other methods of support for the container may be provided. A shaft 5 fitted with two variable eccentricity flyweights 6 and 7 is attached to the bowl ends 2 and 3 below the bottom 1a of the bowl, by means of free rotating bearings 8 and 9. Other arrangements of the eccentric weights may be made to secure a similar motion of the contents of the container. Other basic components of the machine are the cradle 10, the main frame 11, the motor 12, and the belt drive system driven by the motor. In lieu of the belt drive system I may employ a hydraulic or pneumatic drive. The amplitude of movement of the variable eccentric flyweights 6 and 7 may be controlled by varying the position of the weights as will be explained more fully hereinafter. The frequency of vibration is controlled by varying the speed of the driving means. The main frame 11 is a structure with two A frame columns 14 and 15, one at each end, which carry bearings 16 and 17 for mounting the cradle 10 and a gear sector 18 and worm 19 and handwheel 20 arrangement associated with the end frame 14 for tilting the cradle 10 and bowl 1 for dumping, rinsing or cleaning of contents. Frame column 15 supports a base plate 21 for mounting the driving motor 12.

The cradle 10 is an open rectangular frame, normally horizontal, and provided with trunnions 22 and 23 at both ends for pivotal mounting in bearings 16 and 17 on frame columns 14 and 15, for suspending on the main frame and allowing for the turning of the cradle on its longitudinal axis, for dumping, rinsing or cleaning as hereinbefore explained. The cradle 10 has vertical projections or standards 24 and 25 at both ends to receive two cross heads 26 and 27 on which the bowl 1 is suspended by means of the container hanger shafts 4 and 4a running through the upper ends of the bowl's end plates 2 and 3 as described previously.

The cradle 10 also has an additional upright plate 28 at one end to accommodate a countershaft for driving purposes.

The bowl 1 is suspended through container hanger shafts on the cross heads 26 and 27 and floats on compression springs 29 and 30 located under the cross heads 26 and 27 which are free to slide up and down on the guides 31 and 32 formed by the standards or upright projections or standards 24 and 25 of the cradle 10 centered and stabilized by the vertically disposed pintles 33 and 34.

Two sets of tension springs shown at 35, 36 and at 37, 38 are attached to opposite positions laterally of the cradle 10 and to fixed trunnions 39 and 40 on the ends 2 and 3 of the bowl 1. The trunnions 39 and 40 are located on the central axis of the bowl 1 but below the center line of the curved or rounded bottom 1a of the bowl. The outer ends of the tension springs 35, 36; and 37, 38 connect to brackets 41, 42, 43 and 44 respectively, depending from the lower face of the cradle 10. The springs 37–39 limit and control the side swinging of the bowl 1 from its normal, pivoted position.

In operation, when rotary motion is imparted to the shaft 5 carrying the swing weights 6 and 7, the weights gradually swing outwardly, as represented in FIG. 5, creating an eccentric condition. The centrifugal force thus created tends to drag the shaft 5 and the bottom of the bowl 1a in a circular path. The upper part of the bowl 1 can only move in an up and down motion due to the cross heads 26 and 27 being guided by the constraining slots in guides 31 and 32. The resultant motion is shown diagrammatically on the end view assembly drawing in FIG. 6. The shape of the path taken by the motion of the bowl 1 can be modified by adjustment of the lower tension springs, but is generically elliptical, being a combination of the vertical linear motion and the circular motion imparted by the weights. Varying the speed will change the frequency of the cycle. Limiting the outward travel of the flyweights 6 and 7 will modify the amplitude of the vibrations. No variation in drive centers occurs while the machine is in motion or when the bowl is tilted.

The tension on tension springs, 35, 36 and 37, 38 is adjusted by turning the screw eyes 41a, 42a, 43a, and 44a in the brackets 41, 42, 43 and 44, respectively, and locking the screw eyes in set position by means of lock nuts as shown.

The drive motor 12 is slidably mounted on the base 21 and is adjusted through hand screw 45 to shift the motor forwardly or backwardly for purposes of securing the proper tension on the drive belt 46. The drive belt 46 is a V-belt which may be looped over either of two sheaves 47 or 48 on motor shaft 49. The V-belt 46 engages the sheave 50 on the sheave 52 which is journalled upon an extension arm or shaft aligned with trunnion 23. The sheave 50 is integrally connected with or arranged adjacent to the smaller sheave 52 which connects through V-belt 53 with the sheave 54 on the jack shaft 55. Jack shaft 55 is journaled in suitable bearings in the vertically disposed bracket 56 and the vertical projection 28. Jack shaft 55 carries sheave 57 which connects through belt 58 with the sheave 59 on the bowl stub shaft pivotal support 4a. The stub shaft pivotal support 4a also carries sheave 60 which connects through belt 61 to sheave 62 on the flyweight shaft 5. Thus, the flyweight shaft 5 is continuously driven while the bowl 1 is vibrating in an elliptical path. There is no change in centers between stub shaft pivotal supports 4 and 4a and the shaft 5 which are journaled with respect to the end plates 2 and 3 of the bowl. The bowl 1 with the assembled stub shaft pivotal supports 4 and 4a and shaft 5 and the interconnected sheaves 60 and 62 including drive belt 61 continue operation as the bowl 1 vibrates lineally under control of compression springs 29 and 30 and while the bowl executes an elliptical path under control of tension springs 35, 36, 37 and 38. During this vibratory action sheave 59 and drive belt 58 associated therewith move upwardly and downwardly as the bowl 1 is subjected to vibratory action by operation of the flyweight eccentrics 6 and 7 around the jack shaft 55 as a center. None of these motions result in change in distance between shaft centers so that the belts or the hydraulic or pneumatic means of drive remain in proper driving operation at all times.

The eccentric flyweights 6 and 7, shown more particularly in FIGS. 5, and 9–14 consist of an arm 63 pivotally mounted at 64 off center from the axis of shaft 5 and extending around the shaft 5 and terminating in the weighted mass 65. The flyweight casing 75 is provided with a series of apertures 76, 77, 78, 79 and 80 with respect to which the arm 63 moves outwardly towards limit stop member 69 shown inserted in aperture 76 for adjusting the amplitude at which the container 1 is vibrated. By changing the amplitude to which arm 63 swings, the amplitude of the vibration is modified. The end of arm 63 carries the connecting lug 66 which is connected through coil spring 67 with the fixed point 68 within the eccentric flyweight 6. As the speed of operation increases weight 65 is moved centrifugally outwardly changing the period of vibration. The limit stop member 69 positioned in aperture 76 forms part of the flyweight eccentric as shown in FIGS. 5 and 9–14, so that arm 63 may move to the position 63' as a limit. By changing the position of stop member 69 to apertures 77, 78, 79 or 80 different vibratory periods of operation of container 1 can be obtained. This is achieved because the limit stop member 69 occupies a distance closer to the center of rotation of shaft 5 with respect to the swing of arm 63 in a progressive manner, shown more clearly in FIGS. 5 and 13.

FIG. 6 illustrates the characteristic elliptical motion which is imparted to material within the container or bowl 1. The dotted line positions illustrated the displacement bowl 1 during the repeated cycles of operation. For example, the stub shaft pivotal support 4 and 4a successively occupies the positions 4' and 4'', and 4a' and 4a'' while the bowl 1 moves to positions 1' and 1'' producing by the composite motion the elliptical movement represented at 70 for the material in the bowl 1. The motion of the contents of the container may be controlled by the amplitude of the travel of the container as well as by the tilting mechanism of the container and also the curvature of the container which can be so shaped as to control the direction of travel of the mass.

Dumping of the contents of the bowl is accomplished by movement of hand wheel 20, shown in FIG. 7, for shifting the gear 18 for turning cradle 10 and the associated bowl 1 without displacement of any of the tensioned driving belts or the driving centers therebetween to the position shown in FIG. 8.

The shape of the container or bowl 1 may be varied to meet different requirements in the treating of different materials, and I select such shape as will most efficiently permit the handling of particular parts or objects.

The container 1 is normalized for strengthening the welds between the bottom and sides 1—1a and the end plates 2 and 3 by providing reinforcement angles 71 and 72 and tubular tie members 73 and 74 extending between the end plates 2 and 3 and welded thereto. The angle members 71 and 72 are located at the top of the container or bowl 1 while the tubular tie members are located adjacent the base of the container or bowl 1 beneath the curved or rounded bottom 1a.

Figure 2:
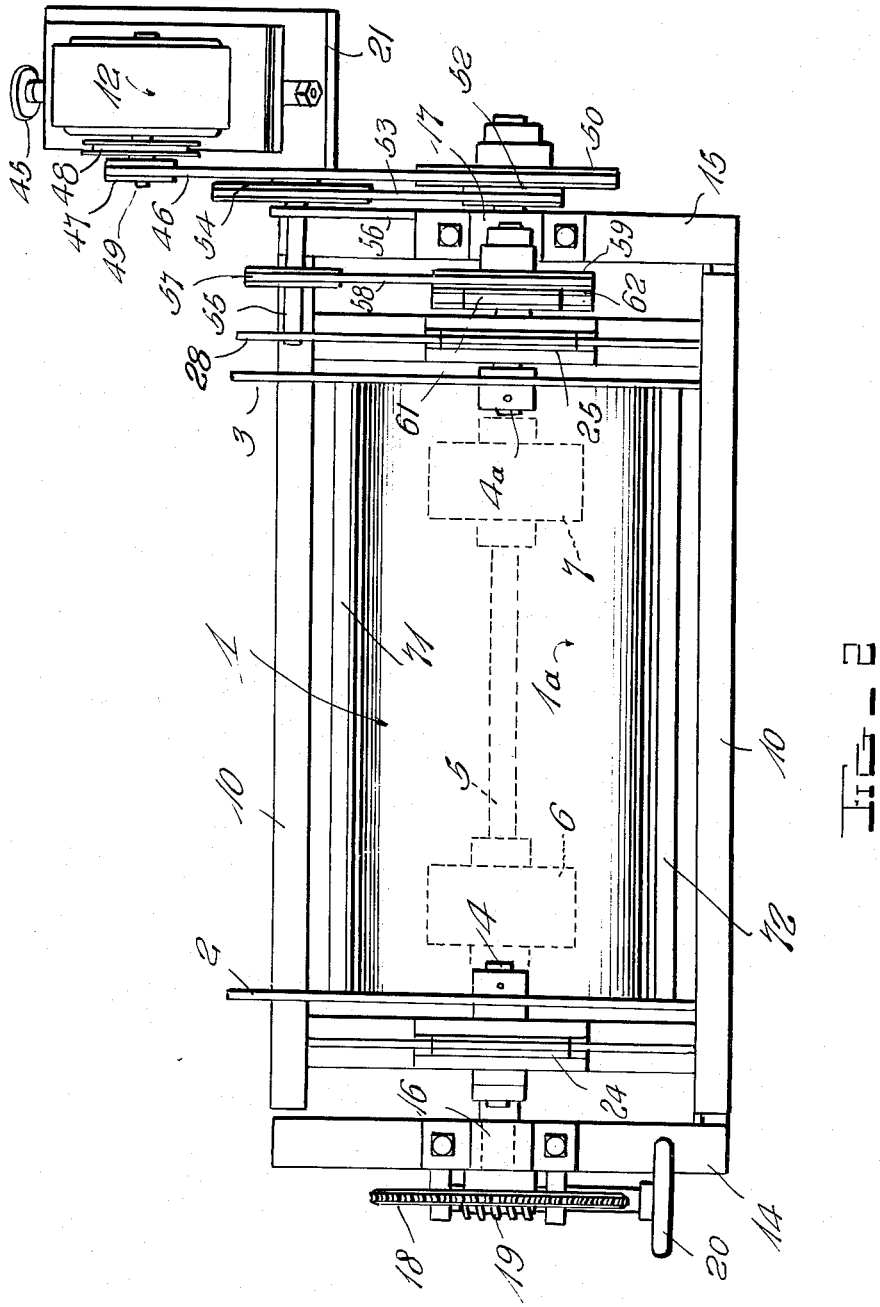
FIG. 2 is a top plan view of the vibrating machine shown in FIG. 1.

The flyweight eccentrics 6 and 7 mounted between the ends 2 and 3 of the container serve as an inertia element attached to the container. These flyweight eccentrics are driven from motor 12 in the form of my invention shown in FIGS. 1–4 and 8, constituting a driving element attached to the frame. The crossheads 26 and 27 establish sliding connection with the guides 31 and 32. The lower part of the container is moved orbitally but not rotatively diurnally, as the upper part of the container reciprocates in a vertical direction all under control of the inertia of the assembly of the shaft 5 and flyweight eccentrics 6 and 7 and the floating mounting provided by springs 29 and 30. In carrying out the method of my invention the media for processing the articles or work pieces is maintained in contact with the articles or work pieces and the articles or work pieces and the media move relatively to produce a scrubbing action in rotation orbitally but not diurnally. The rotation as shown in FIG. 6 is compounded into said reciprocation and into said orbital rotation.

In the modified form of my invention, shown in FIGS. 15 and 16, the shaft 5 is foreshortened and installed as shown at 5', journaled between the intermediate plates 81 and 82 connected with the container or bowl 1 displaced inwardly from the end plates 2 and 3. In this arrangement the end plate 3 carries the hydraulic or pneumatic motor 83 which drives the rotary shaft 84 coupled through the coupling 85 to the shaft 5'. The eccentrics carried by shaft 5' are the same as heretofore explained in FIGS. 9-14 and FIG. 5, and I have designated the eccentrics in FIG. 15 at 6' and 7' to show the similarity in function of these eccentrics with respect to the eccentrics 6 and 7 of FIGS. 1-4 and FIG. 8. As shown in FIG. 16, the pneumatic or hydraulic motor 83 has an intake flexible hose connection shown at 86 and an exhaust flexible hose connection shown at 87 leading to the supply and discharge connections of a pump and reservoir hydraulic or pneumatic system. These flexible connections 86 and 87 convey the operating fluid to the motor 83 without restricting the vibratory movement of the motor in the normal operation of the vibrating machine and without restricting the ability of the container or bowl 1 to be moved to the discharge position shown in FIG. 8 by movement of cradle 10 on pintles journaled in bearings 16 and 17. In the form of my invention shown in FIGS. 15 and 16, the mass of the hydraulic or pneumatic motor 83 forms part of the inertia of the bowl or container 1. To compensate for the mass of the hydraulic or pneumatic motor 83, I provide a weight 88 on end plate 2 of the bowl or container 1 which symmetrically balances the mass of the hydraulic or pneumatic motor 83 enabling rotary movement to be imparted by hydraulic or pneumatic motor 83 to shaft 84, coupling 85 and shaft 5' for rotatably driving eccentric flyweights 6' and 7'. The vibratory movement to container or bowl 1 is produced as heretofore explained in connection with the form of my invention shown in FIGS. 1-4 and FIG. 8.

As heretofore indicated, I found the vibratory method of my invention superior to conventional tumbling methods in operations upon various kinds of work. I have succeeded in removing stock on different kinds of work, ten to one hundred times as fast with my vibratory method as distinguished from conventional tumbling methods. Stock removal proceeds at an extreme rate at the beginning of vibration and it follows that labor and processing costs can be reduced to a minimum by use of the method of my invention. For example, when using a tumbling process with #0 Fused Aluminum Oxide Tumbling Chips, stock removal of 0.0006" was accomplished in four hours. The material treated was annealed oil-hardening tool steel which is comparable with valve steel in its response to tumbling. The same amount of material was removed in 0.02 hours by the vibration method of my invention treating the valve steel with the same abrasive. In other words, the vibration method of my invention operated 200 times faster than the conventional tumbling method. Other tests and production runs confirm these findings.

While I have described my invention in certain of its preferred embodiments, I realize that modifications may be made. For example, in lieu of the suspension of the container and the depending relationship thereof with respect to the cradle as heretofore explained, I may mount the container or bowl directly upon coil springs and subject the container to the vibratory movement as heretofore explained.

In lieu of the two eccentric flyweights 6 and 7 or 6' and 7' I may employ a single elongated eccentric symmetrically mounted on shaft 5 or 5' to secure a vibratory motion equivalent to the movement heretofore described in connection with the operation of the two eccentric flyweights.

I desire that it be understood that no limitations upon my invention are intended except as may be imposed by the scope of the appended claims.

What I claim as new and desire to secure by Letters Patent of the United States is as follows:

1. A vibrating machine comprising a frame, a cradle journaled in said frame and normally occupying a substantially horizontal position, vertically extending standards mounted on opposite ends of said cradle, journaling means in the upper extremities of said standards disposed on an axis extending longitudinally with respect to said cradle, a bowl depending from said journaling means and freely swingable with respect thereto and extending downwardly through said cradle, spring means resiliently supporting said bowl with respect to said journaling means, tension means for controlling the movement of said bowl within said cradle and inertia means attached to said bowl for imparting an eccentric movement thereto for vibrating said bowl.

2. A machine as set forth in claim 1 in which there is a sliding connection between the standards and the journaling means for the upper part of the bowl.

3. A machine for cleaning, scaling, skinning, deburring, grinding, radii forming, fine finishing, coloring and burnishing articles comprising a frame, a cradle supported by said frame, a rigid container resiliently suspended from an upper portion of said cradle and open at the top for receiving and discharging abrading media and articles to be treated, means carried by said container for imparting vibratory displacements to the lower part of the container orbitally, and resilient means for restoring each displaced position of the upper part of the container to the initial position thereof.

4. A vbrating machine as set forth in claim 3, in which the means carried by said container for subjecting said container to vibration consists of an eccentric flyweight and wherein there are means supported on said frame for driving said flyweight, said means consisting of a motor, and a belt and sheave system interposed between said eccentric flyweight and said motor for revolving said flyweight from said motor for transversely vibrating said bowl.

5. A vibrating machine as set forth in claim 3 in which the means carried by said container for subjecting said container to vibration consists of an eccentric flyweight system which is adjustable over a predetermined range of centrifugal force, and wherein the means for driving the flyweight system is mounted on said container.

6. A vibrating machine as set forth in claim 3 in which the means carried by said container for subjecting said container to vibration consists of an eccentric flyweight system which is adjustable over a predetermined range of centrifugal force and wherein the means for driving the flyweight system is mounted on said frame and rotatively connected with said flyweight system.

7. A vibrating machine as set forth in claim 3 in which the container has a curved bottom and in which the resilient means for restoring each displaced position of the upper part of the container consists of pairs of transversely disposed tension springs located at opposite ends of said container and connecting positions in the ends of said container which are below the center line of the curved bottom and above the center line of the means carried by the container for subjecting the container to vibration.

8. A machine as set forth in claim 3 in which the means for resiliently mounting said container on said frame comprises a sliding connection between the frame and the upper part of the container and wherein the means for imparting vibratory displacements to the lower part of the container orbitally comprises an inertia element attached to the container, and means for rotating said element.

9. A machine according to claim 3 in which the means for imparting vibratory displacements to the upper part of the container comprises a sliding connection between the frame and the upper part of the container and wherein the means for imparting vibratory displacements to the lower part of the container orbitally comprises an inertia element attached to the container and means attached to the frame for rotatively driving said inertia element.

10. A vibrating machine comprising a frame, a cradle having trunnions on opposite ends thereof and journaled in said frame, standards mounted adjacent opposite ends of said cradle and projecting above the cradle, guides formed in said standards, crossheads vertically movable in said guides, spring means located in said guides below said crossheads for cushioning said crossheads, stub shaft pivotal supports mounted in said crossheads and forming a container hanger means, a container having a curved bottom and end plates pendently suspended on said container hanger means, and projecting through said cradle, means tensioning said container with respect to said cradle, whereby said container has its opposite sides and ends spacially related to the inside peripheral limits of said cradle and means for imparting a swinging movement to said container within the limits of said cradle.

11. A vibrating machine as set forth in claim 10 in which the means tensioning said container with respect to said cradle consists of tension springs which are connected to said container at opposite ends thereof below the center line of the curved bottom and with transversely opposite positions on said cradle.

12. A vibrating machine as set forth in claim 10, in which the means for imparting a swinging movement to said container consists of a pair of adjustable flyweight eccentrics journaled longitudinally beneath said container, and means for rotatively driving said eccentrics from one end of said container.

13. A vibrating machine comprising a frame, a cradle having trunnions on opposite ends thereof and journaled in said frame, standards mounted adjacent opposite ends of said cradle and projecting above the cradle, vertically extending guides formed in said standards, crossheads vertically slidable in said standards within said guides, vertically disposed pintles mounted within said standards centrally between said guides, a coil spring concentrically arranged around each of said pintles for supporting said crossheads, a container hanger shaft mounted in each of said crossheads and extending longitudinally with respect to said cradle, a container having end plates suspended pendently on said container hanger shafts and projecting through said cradle, means for centering said container in spacial relation to the opposite sides of the interior walls of said cradle, and means carried by said container for imparting a swinging movement to said container within the limits of said cradle.

14. A vibrating machine as set forth in claim 13, in which means external to said cradle imparts rotary movement to the means carried by said container for vibrating said container.

15. A vibrating machine comprising a container having a curved bottom, a frame, means for pendently suspending said container within said frame, means for resiliently cushioning said aforementioned means, centrifugally operated means attached to said container for imparting vibratory movement to said container, a cradle surrounding said container and spacially related thereto, means for tensioning said container within said cradle whereby displacement of said container toward one side of the interior wall of said cradle is accompanied by a restoring force tending to return said container toward the other side of said cradle and means external to said frame for rotatably driving said centrifugally operated means.

16. A vibrating machine as set forth in claim 15, in which said means for tensioning said container consists of two sets of symmetrically arranged tension springs, one set of said springs being disposed adjacent one end of said container and the other set of said springs being arranged adjacent the opposite end of the container, the springs of each set being connected to positions in the said ends of the container below the center line of the curved bottom of the container and connected to transversely opposite positions on said cradle.

17. A vibrating machine as set forth in claim 15, in which said container includes longitudinally extending reinforcement means extending both above and below the center of curvature of the bottom of the container.

References Cited in the file of this patent

UNITED STATES PATENTS

| | | |
|---|---|---|
| 982,156 | Miltz | Jan. 17, 1911 |
| 2,469,484 | Thiman | May 10, 1949 |
| 2,613,036 | Robinson | Oct. 7, 1952 |
| 2,727,697 | Stone | Dec. 20, 1955 |
| 2,774,244 | Bergstrom et al. | Dec. 18, 1956 |
| 2,840,923 | Behrens | July 1, 1958 |
| 2,875,989 | Toulmin | Mar. 3, 1959 |
| 2,882,024 | Behrens | Apr. 14, 1959 |
| 2,918,926 | Behnke | Dec. 29, 1959 |

FOREIGN PATENTS

| | | |
|---|---|---|
| 23,810 | Great Britain | Mar. 2, 1911 |
| 233,164 | Germany | Apr. 1, 1911 |